United States Patent
Deisher et al.

(10) Patent No.: US 7,184,960 B2
(45) Date of Patent: Feb. 27, 2007

(54) SPEECH RECOGNITION COMMAND VIA AN INTERMEDIATE MOBILE DEVICE

(75) Inventors: Michael E. Deisher, Hillsboro, OR (US); Rajesh P. Banginwar, Hillsboro, OR (US); Robert C. Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 921 days.

(21) Appl. No.: 10/187,232

(22) Filed: Jun. 28, 2002

(65) Prior Publication Data

US 2004/0002866 A1 Jan. 1, 2004

(51) Int. Cl.
*G10L 15/22* (2006.01)
(52) U.S. Cl. .................................... 704/275
(58) Field of Classification Search ............... None
See application file for complete search history.

(56) References Cited

U.S. PATENT DOCUMENTS

| | | | |
|---|---|---|---|
| 5,146,538 A * | 9/1992 | Sobti et al. ............... 704/201 |
| 6,253,176 B1 * | 6/2001 | Janek et al. ............... 704/231 |
| 6,407,779 B1 * | 6/2002 | Herz ............................ 348/734 |
| 6,535,854 B2 * | 3/2003 | Buchner et al. ............. 704/275 |
| 6,975,993 B1 * | 12/2005 | Keiller ........................ 704/275 |
| 6,988,070 B2 * | 1/2006 | Kawasaki et al. ........... 704/275 |
| 6,993,486 B2 * | 1/2006 | Shimakawa ................. 704/275 |
| 2002/0055924 A1 * | 5/2002 | Liming ........................ 707/100 |

FOREIGN PATENT DOCUMENTS

EP   0 911 808   *   4/1999   .................. 704/275

* cited by examiner

*Primary Examiner*—Donald L. Storm
(74) *Attorney, Agent, or Firm*—Blakely, Sokoloff, Taylor & Zafman LLP (57) ABSTRACT

According to an embodiment of the invention, a physical location of a mobile device is determined, and a determination is made that a subject device is available for command via the mobile device based at least in part on the physical location of the mobile device. Information regarding voice recognition capability of the subject device is transferred to the mobile device. A voice command is received by the mobile device, the voice command is interpreted, and an instruction is provided to the subject device based at least in part on the voice command.

29 Claims, 6 Drawing Sheets

Interaction Between
Intermediate Device and Subject Device

Figure 1

Interaction Between
Intermediate Device and Subject Device

Figure 2

Discovery and Capability Exchange

Figure 3 — Speech Recognition Command Under Embodiment of the Invention

Exemplary Intermediate Device

SPEECH RECOGNITION COMMAND VIA AN INTERMEDIATE MOBILE DEVICE

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright © 2002, Intel Corporation, All Rights Reserved.

FIELD

An embodiment of the invention relates to communication in general, and more specifically to speech recognition command via an intermediate device.

BACKGROUND

As more devices and appliances are designed for ease of use by individuals, speech recognition has become a more common feature. The use of speech recognition allows an individual to communicate with and provide commands to a device with minimal usage of an input controls such as a keypads, buttons, dials, or other controls.

However, vocal patterns for a particular word or phrase may vary widely from one individual to another. In conventional speech recognition, a device generally either is designed to respond to many different vocal patterns, or is trained or programmed to respond properly to the commands of a particular individual. If a device is designed to respond to the speech commands made in many different vocal patterns, it is likely the device will not respond accurately to all commands and may require that commands be repeated multiple times until commands can be understood. The numerous and wide variations that occur in speech patterns may make it very difficult to respond correctly to all commands from all individuals. However, if devices are instead trained to respond to an individual's voice commands, then the individual repeats this training process for each device to be commanded. Further, if multiple users are to command the same device, then each of the users undergoes through the same training process to enable the device to respond to voice commands.

If many types of devices are subject to voice command, in conventional systems each device has its own speech recognition system, comprised of all hardware and software needed for speech recognition. For example, each such device may have a microphone, an analog to digital converter, and a digital signal processor. The addition of these items to each device being commanded can result in a great deal of added expense for the design and manufacture of devices with speech recognition capability.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for speech recognition command via an intermediate device.

In the following description, for the purposes of explanation, numerous specific details are set forth. However, it is understood that embodiments of the invention may be practiced without these specific details. In other instances, well-known circuits, structures, techniques, and devices have not been shown in detail in order not to obscure the understanding of this description.

Embodiments of the invention include various processes, which will be described below. The processes may be performed by hardware components or may be embodied machine-executable instructions, which may be used to cause a general-purpose or special-purpose processor or logic circuits programmed with the instruction to perform the processes. Alternatively, the processes may be performed by a combination of hardware and software.

Terminology

Before describing an exemplary environment in which various embodiments of the present invention may be implemented, some terms that will be used throughout this application will briefly be defined:

As used herein, "intermediate device" means any device that is utilized in connection with communications with a subject device. An intermediate device includes, but is not limited to, a mobile device.

As used herein, "mobile device" means any device that is mobile and that is capable of communication functions. A mobile device includes, but is not limited to, a personal digital assistant (PDA) with communication functions; a mobile computer with wireless network access; a cellular telephone; a computer installed in a motor vehicle that may be connected to a network; and other such devices.

As used herein, "subject device" means any device that is capable of receiving commands, including, but not limited to, a speech-enabled device.

As used herein, "device under command" means any device that is controlled by voice commands.

Under an embodiment of an invention, an intermediate device has speech recognition capability and a user of the device trains the intermediate device to respond the speech characteristics of the user. Under one embodiment, the intermediate device is a mobile device, but other types of intermediate devices may also be used. Under an embodiment of the invention, an intermediate device is in the vicinity of a subject device. Under an embodiment, the subject device is discovered or detected. Upon detection, there is an interaction between the intermediate device and the subject device regarding capabilities of the subject device and the grammar the subject device understands.

Upon the intermediate device receiving capability information, the intermediate device and the subject device can understand each other and the speech-enabled device can be commanded using the intermediate device, thereby becoming the "device under command" as described herein. Expressed in an alternative way, the intermediate device user can use speech commands directed to the intermediate device to produce instructions that will be understood by the device under command.

Under an embodiment of the invention, the function of speech recognition for operating devices is transferred to an intermediate device, such as a mobile device, that is then used to communicate and control a variety of subject devices. With the speech recognition function transferred to an intermediate device, an individual is not required to teach every device that is controlled to respond to the voice of an individual. Instead, the user of the intermediate device may go through the process of training or programming the intermediate device once and use the intermediate device to control many different subject devices.

Under an embodiment of the invention, multiple intermediate devices may be utilized to control the same subject device. Under the embodiment, each such intermediate device has been trained or programmed to respond to the voice and vocal patterns of a particular individual. According to the embodiment, the user of each intermediate device can operate the same speech-enabled device without requiring that the speech-enabled device be trained to the voice and vocal patterns of each individual.

Under a particular embodiment of the invention, a single intermediate device may be trained or programmed to respond to the voice and vocal patterns of multiple individuals. Under the embodiment, any of the individuals whose voice and vocal patterns have been analyzed may use the intermediate device for communication with a device under command.

Under an embodiment of the invention, the transfer of the speech recognition function to an intermediate device allows for more accurate communications with a subject device. For example, a subject device may attempt to provide for universal voice communication without programming for individual users. If a subject device is used by many different individuals, such as a common device located in a public place, it might not be practical or possible to train the device to respond to each individual's voice and vocal patterns. In one example, a public device such as an automatic teller machine or automated kiosk may attempt to respond to voice commands, but is required to understand vocal patterns of any member of the population that uses the device. The use of an intermediate device, such as a mobile device, that understands the commands of the user in conjunction with the public device allows for communication with a high degree of accuracy, thereby allowing a user to more quickly and easily complete a transaction.

The speech capabilities of subject devices will vary. In one example, a device has a grammar comprised of certain defined spoken commands. In such example, the subject device expects certain speech formats and communicates these formats to an intermediate device. In another example, a device is not itself speech-enabled and a specific grammar description is not available for communication to the intermediate device.

Under an embodiment of the invention, a subject device may itself not be speech-enabled, but may be commanded through use of an intermediate device. The subject device may have instructions to which the subject device responds that can be determined. The instructions may be mapped to voice commands understood by the intermediate device, thereby allowing voice command of a subject device that is not speech-enabled. The instructions to which a subject device responds may be determined in various ways. Under a particular embodiment of the invention, the operation of a subject device is detected in a network, such as in the example of universal plug and play (UPnP), in which a device is automatically detected and installed on a network. The automatic detection and operation of the device under command is then utilized in determining an instruction set for the intermediate device. With the instruction set known, a spoken command understood by the intermediate device may be mapped to each relevant instruction.

Under an embodiment of the invention, the intermediate device may operate independently of the language or dialect that is spoken by the user of the device. For example, if the intermediate device is trained or programmed to understand words or phrases from a language other than English, the words or phrase may be mapped to commands corresponding to a device of under command. In one example, a speech-enabled subject device may have a specified set of commands that are expected in a first language. An individual may control the subject device in a second language if the intermediate device maps the commands in the first language to commands in the second language.

Figure 1:
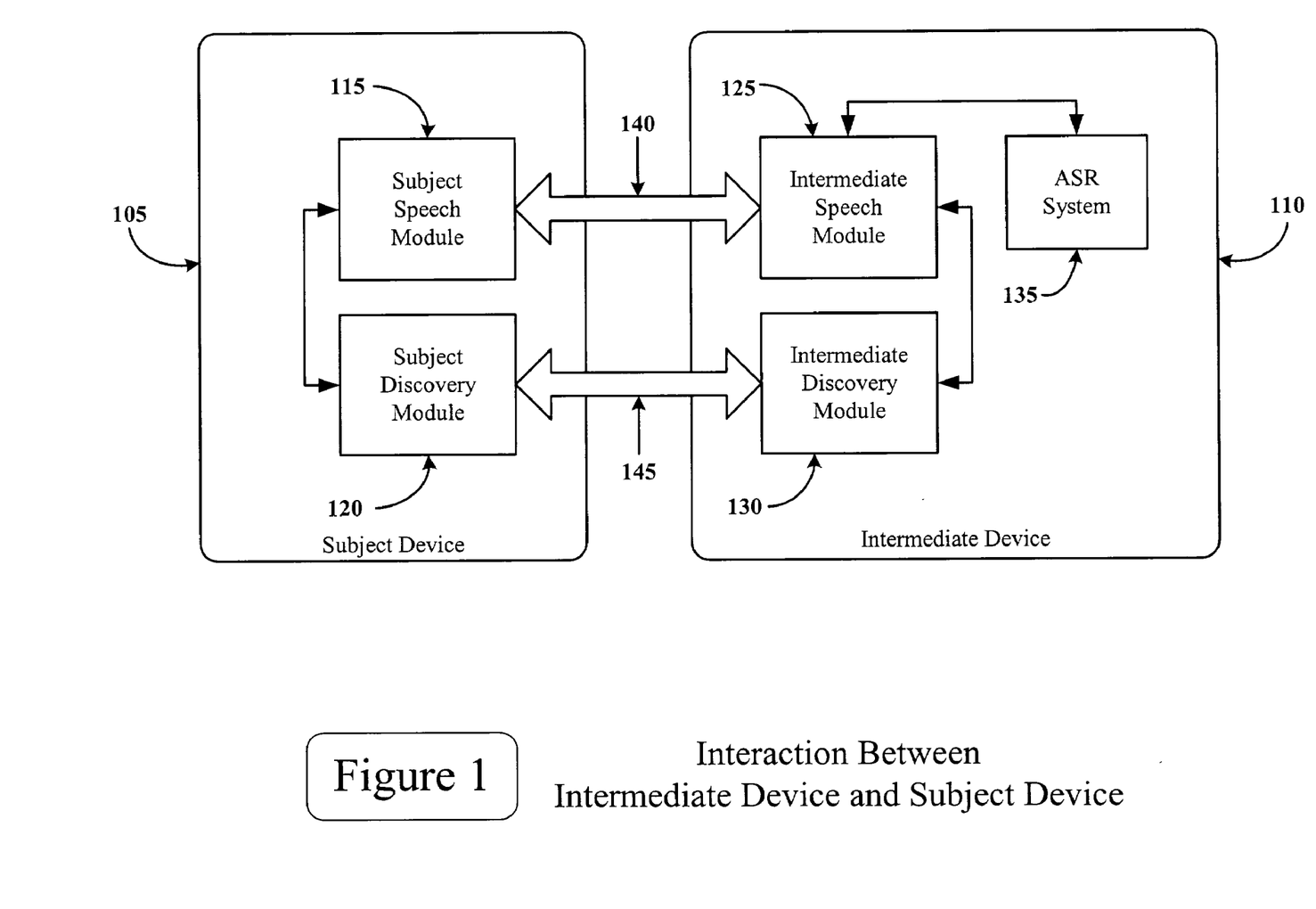
FIG. 1 illustrates interaction between an intermediate device and a subject device according to an embodiment of the invention.

FIG. 1 is an illustration of interaction between an intermediate device and a device under command under an embodiment of the invention. In this illustration, an intermediate device 110 communicates with a subject device 105. The subject device 105 includes a subject speech module 115 and a subject device discovery module 120. The intermediate device includes an intermediate speech module 125, an intermediate device discovery module 130, and an automatic speech recognition (ASR) system 135.

The intermediate device 110 attempts to discover any subject devices that are in the vicinity. According to the embodiment of the invention, the intermediate device discovery module 130 and the subject device discovery module 120 facilitate the exchange of information regarding system availability. Under an embodiment of the invention, the physical location of the intermediate device 110 may be determined via the intermediate discovery module 130 through use of any known technology, including ad-hoc discovery of peers, hotspot detection, global positioning satellite (GPS) systems, or local area network detection, as appropriate for the connectivity capabilities and installed equipment in the intermediate device 110. With the physical location of the intermediate device determined, the relevant subject devices are identified. In one example, the parameters of the subject devices may be stored in the intermediate device. In another example, the parameters of the subject device may be available from other infrastructure components, such as a presence server that contains data regarding the attributes and location of subject devices.

According to an embodiment of the invention, the intermediate device 105 provides a signal using the intermediate discovery module 120 via a communication channel 145, such as by radio signal, requesting a reply from available subject devices. The subject device 105 returns a response via the communication channel 145 indicating that the subject device is available. If more than one subject device is available in the vicinity of the intermediate device 110, the intermediate speech module 125 provides a clarification dialogue for the user to allow the user to select which subject device will be the device under command.

The subject speech module 115 of the subject device 105 may contain a list of the capabilities of the device and a set of grammars, dialogue structures, and vocabularies for voice access of the device's capabilities. In some examples, the device may not be speech-enabled and may not have speech capabilities. Information regarding any speech capabilities is communicated 140 to the intermediate speech module 125 of the intermediate device 110.

The automatic speech recognition (ASR) system 135 of the intermediate device 110 provides speech feature extraction, acoustic modeling, speech recognition, and speech understanding capability. Under an embodiment of the invention, the user of the intermediate device 110 provides voice commands, which are extracted and understood by the automatic speech recognition system 135. The intermediate speech module 125 then communicates the command to the subject speech module 115, which interprets the commands as instructions for the subject device 105.

Figure 2:
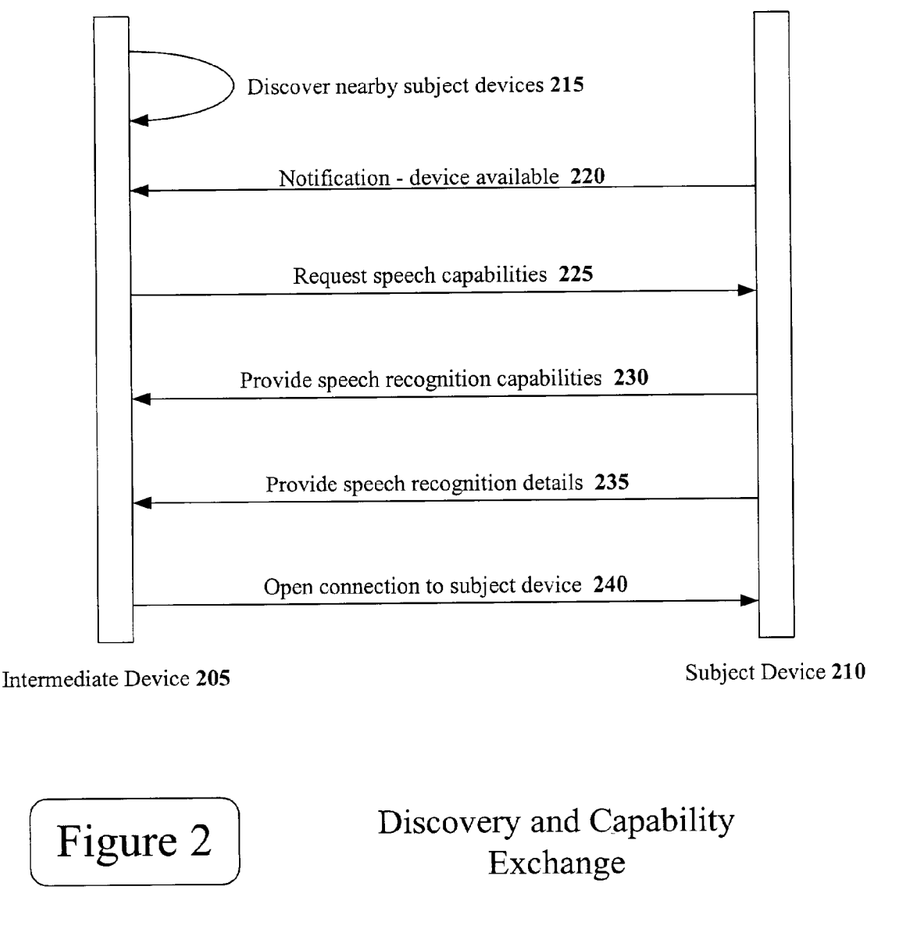
FIG. 2 illustrates discovery and capability exchange under an embodiment of the invention.

FIG. 2 illustrates the discovery and capability exchange between an intermediate device 205 and a subject device 210 according to an embodiment of the invention. In this example, the intermediate device will attempt to discover nearby devices 215. The method of discovery will vary according to the embodiment. Under one embodiment, the intermediate device performs network discovery to find nearby devices. Which devices will be discovered is dependent on the embodiment of the invention and various factors in the particular environment. The devices discovered are subject devices that are relevant for the physical location and situation of the intermediate device.

In the example shown in FIG. 2, the subject device 210 provides a notification 220 to the intermediate device 205 that subject device 210 is available. The intermediate device 205 then provides a request regarding speech capabilities 225 to the subject device 210. In response, the subject device 210 provides information regarding speech recognition capabilities 230 to the intermediate device 205. If the subject device 210 is speech-enabled, the device will provide grammar and other details regarding speech recognition capabilities 235 to the intermediate device 205. If a subject device is not speech-enabled, an intermediate device may still control the subject device under an embodiment in which voice commands are mapped to instructions understood by the subject device. In the example shown in FIG. 2, the intermediate device 205 opens a connection 240 to the subject device 210, which may then be referred to as the device under command.

Figure 3:
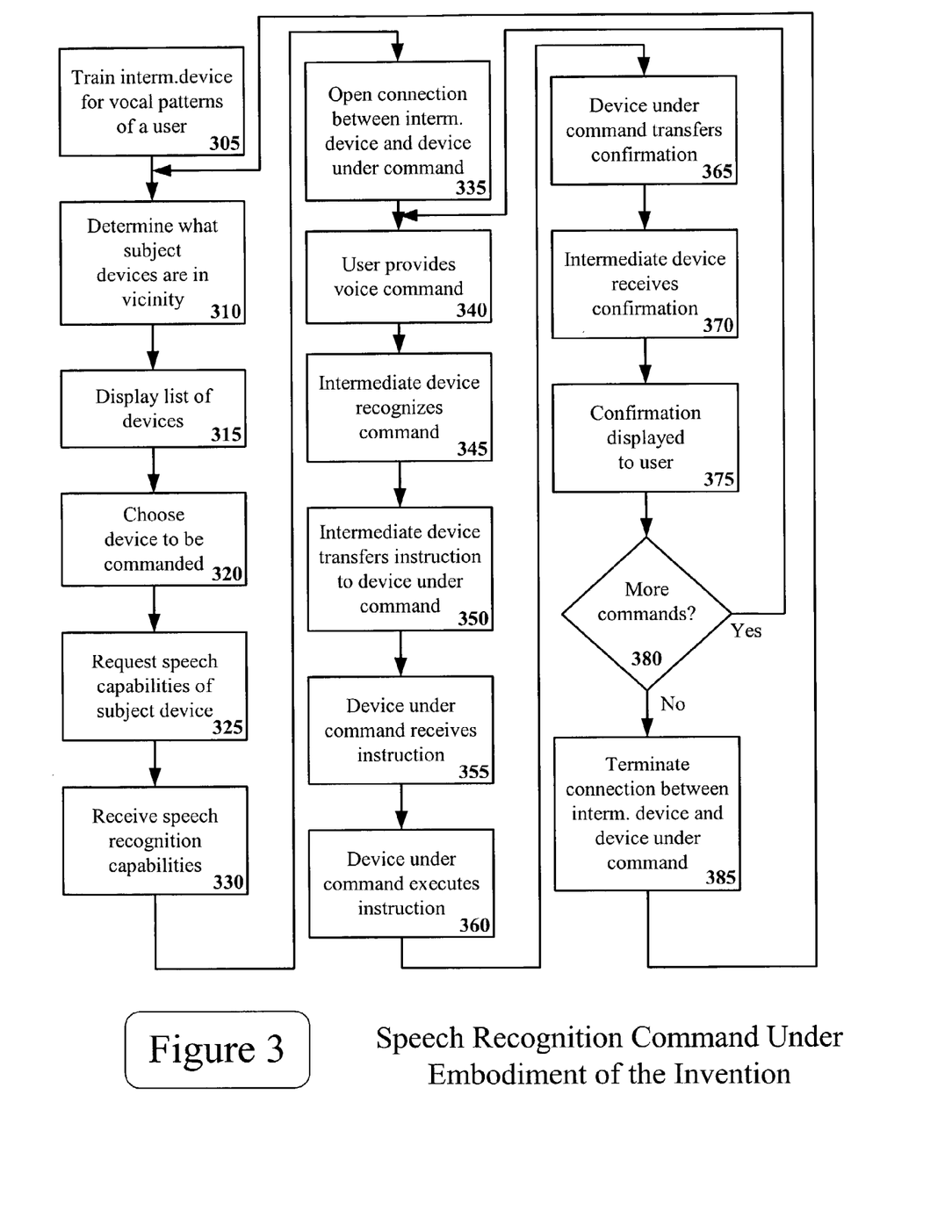
FIG. 3 is a flowchart demonstrating speech recognition command under an embodiment of the invention.

FIG. 3 is a flowchart that illustrates the process of speech recognition command under an embodiment of the invention. Under the embodiment illustrated, an intermediate device is initially trained or programmed to respond to the vocal patterns of a particular device user, process block 305. When the intermediate device is operated, there is a determination regarding which subject devices are located in the vicinity of the intermediate device, process block 310. The intermediate device then provides a list of possible subject devices to the user, process block 315. The user of the intermediate device chooses the device that will be commanded, process block 320, with the choice being made by vocal command or by some other method of inputting or communicating the choice made.

After the subject device to be commanded has been chosen, the intermediate device requests the speech capabilities of the subject device, process block 325, and the speech capabilities are provided by the subject device, process block 330. A connection is opened between the intermediate device and the subject device, which is now the device under command, process block 335. The user of the intermediate device can then operate the device under command. The user provides a voice command to the intermediate device, process block 340, and the intermediate device recognizes the command, process block 345. The intermediate device then transfers the appropriate instruction to the device under command, process block 350. The device under command then receives the transmitted instruction, process block 355, and executes the instruction, process block 360.

In the example shown in FIG. 3, the device under command then transfers a command confirmation, process block 365, which is received by the intermediate device, process block 370, and provided to the user in some form, process block 375. In actual operation, there may be many commands and other types of communications that are communicated between the intermediate device and the device under command. In the example shown, if there are no more commands required for the device under command, process block 380, then the connection between the intermediate device and the device under command is terminated, process block 385, and the process of discovering subject devices in the vicinity can commence again. The process illustrated in FIG. 3 is not intended to demonstrate all possible processes in the operation of speech recognition command via an intermediate device, and the actual operations and communications will vary accordingly to the embodiment.

Under an embodiment of the invention, if an intermediate device is in the vicinity of multiple subject devices, the intermediate device will provide a list of available subject devices to the user. In one example, the intermediate device may receive a list in the form of a graphical user interface (GUI) or display. According to the embodiment, the user may choose the device that will be the device under command either by providing a verbal choice or by otherwise inputting the choice into the intermediate device. After a subject device is chosen, the process of opening a communication channel with the device commences. In certain embodiments, a user may choose multiple devices for command. In one example, a user may choose multiple devices if the devices work in unison or have operations that may be coordinated.

Figure 4:
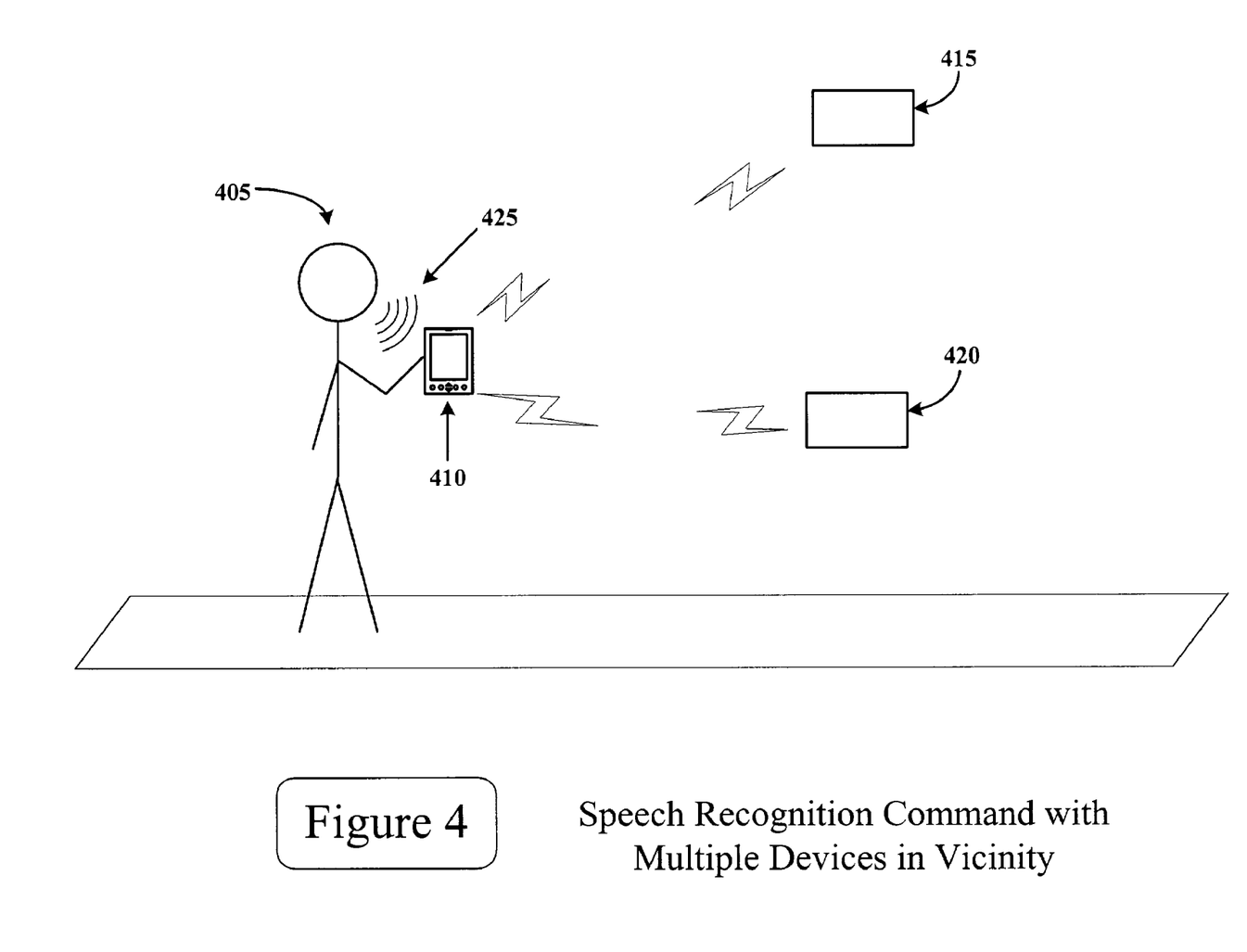
FIG. 4 illustrates the performance of speech recognition command when multiple subject devices are in the vicinity of an intermediate device under an embodiment of the invention.

FIG. 4 is an illustration of speech recognition command with multiple devices in the vicinity of an intermediate device. In this example, an individual 405 who is in possession of a mobile device 410 is in the vicinity of multiple subject devices, shown here as a first subject device 415 and a second subject device 420. In this example, the mobile device 410 attempts to discover what subject devices are in the vicinity. The method of discovering subject devices and the manner of communication between devices will vary according to the particular embodiment. In the illustrated embodiment, the mobile device 410 may transmit a request signal. The first subject device 415 and the second subject device 420 respond to the request signal and indicate that the devices are available. The mobile device 410 provides a list of available subject devices to the individual 405. The individual 405 chooses one of the subject devices and the mobile device 410 opens communication with the chosen device. The individual then can provide a vocal command 425 to the mobile device 410 in order to provide instructions to the chosen device. In certain embodiments, the individual 405 may choose multiple devices for command.

The devices that are detected as being near to or in proximity to a intermediate device will vary according to the embodiment of the invention and the context of use. For example, when an intermediate device is utilized in a home environment, the devices may include all devices that are located within the home to allow any device in the home to be controlled from any room. In another example, a business environment may be divided into several buildings, departments, areas, and other subparts. An intermediate device may be present in a particular location in the business environment. The subject devices detected and displayed to the user of an intermediate device will be any speech-enabled devices that are relevant to the current location of the intermediate device. In one example, the subject devices displayed may include only devices in particular office or a limited geographic area of a complex. In another example, the subject devices displayed may include devices throughout a complex that connected to a particular department or unit.

The determination of the location of an intermediate device varies according to the particular embodiment of the invention and may be performed by any known method. Embodiments of the invention may utilize many different types of communication technology, including, but not limited to, a wireless local area network (WLAN), such as a WLAN under Institute of Electrical and Electronics Engineers (IEEE) standard 802.11b for wireless local area networks (IEEE, September 1999); other wireless technologies, such as Bluetooth protocol systems; cellular telephone technologies, including enhanced 911 (E911) technologies; and other communications technologies.

The communication process between an intermediate device and a subject device under command will vary according to the embodiment. According to one embodiment of the invention, an intermediate device communicates directly with another device, such as in a peer-to-peer communication. In an example, the intermediate device and each subject device has a compatible radio transceiver or other type of communication device or interface. In another embodiment of the invention, one or more subject devices are connected in a network. The network may be of any form, including a traditional wired network, a power line network, or a wireless network, including a wireless ethernet service provided under IEEE standard 802.11b for wireless local area networks. In other embodiments, the subject device and the intermediate device may utilize another network or communication link that has connectivity with the subject network to interact. Under one embodiment of the invention, a communication link may be made using a public network such as a cellular telephone network or similar service. Under one embodiment of the invention, an intermediate device may communicate over the Internet and thereby reach a network containing a subject device remotely. According to one embodiment, each subject device in a network may be detected and installed using universal plug and play or another detection method.

The specific devices that may be detected as subject devices and that may act as devices under command vary with the particular embodiment of the invention. Devices may include diverse items such as household appliances and devices in an intermediate device user's home; automated teller machines, public kiosks, and other publicly located devices; devices or systems within a motor vehicle, airplane, boat or other vehicle; controls for machinery in a manufacturing plant or other operation; and systems and devices operated in a business office. Many other examples may be provided for other environments.

Figure 5:
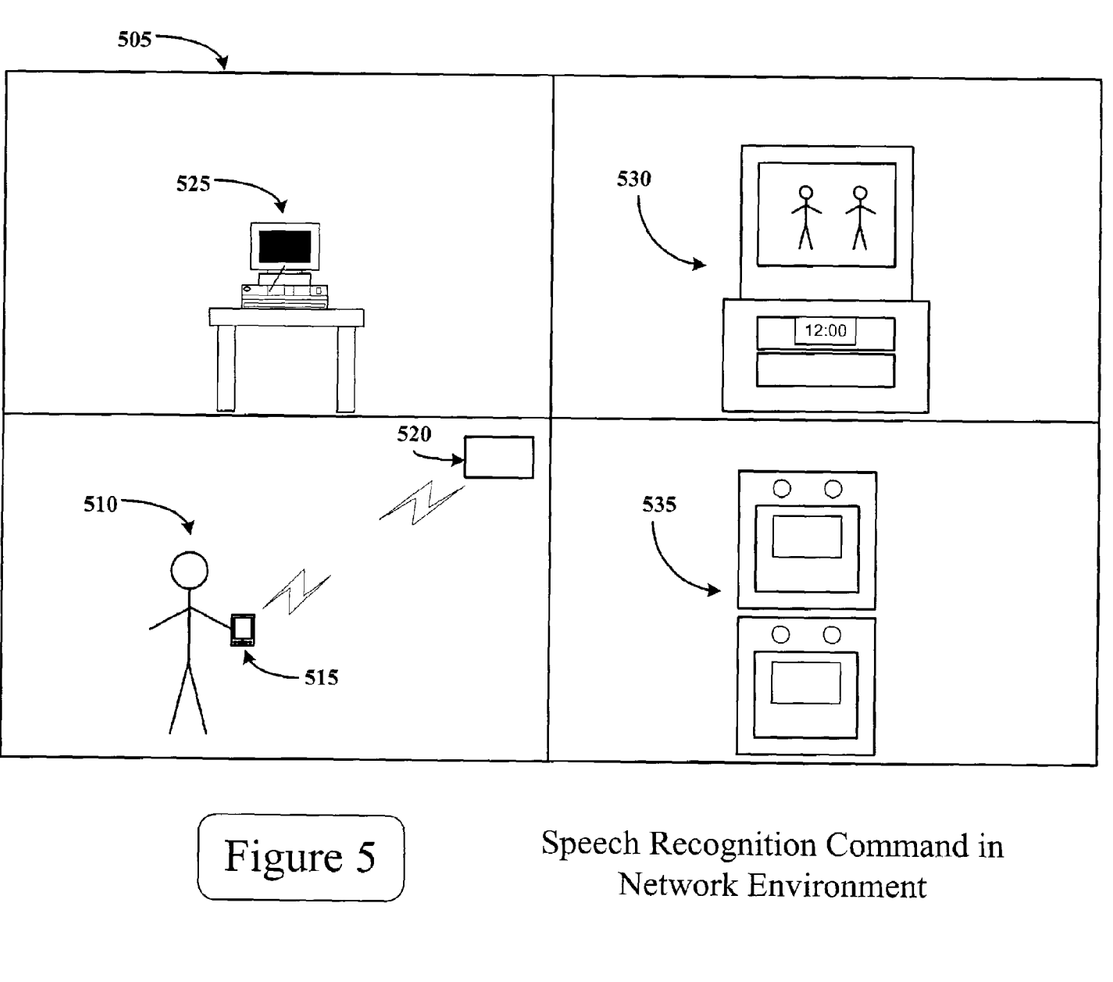
FIG. 5 illustrates speech recognition command in a home network environment under an embodiment of the invention.

FIG. 5 is an illustration of speech recognition command in a particular environment. In this example, a home 505 includes a network. A device user 510 is in possession of a mobile device 515. The mobile device 515 communicates with the network by any appropriate method, in this illustration shown by the mobile device 515 transmitting to a network access point 520. If the mobile device 515 attempts to discover the available subject devices on the home network, the list may include a personal computer 525, which may act as the server for the network, a personal entertainment system 530, and a set of cooking ovens 535.

If the device user 510 chooses the personal computer 525, certain commands regarding the computer operation or the network may be executed. If the device user 510 chooses the personal entertainment system 530, the user may program the recording of certain programs, request that the system notify the device user 510 when a certain program begins, or direct other commands to the system. If the device user 510 chooses the set of cooking ovens 535, the device user 510 may set or adjust cooking times, request notification when cooking times are completed, or otherwise command the operation of the ovens. The subject devices shown in FIG. 5 are examples of possible devices that may be included in an embodiment of the invention and are not intended to limit the type or number of devices that may be included in the illustrated environment.

Figure 6:
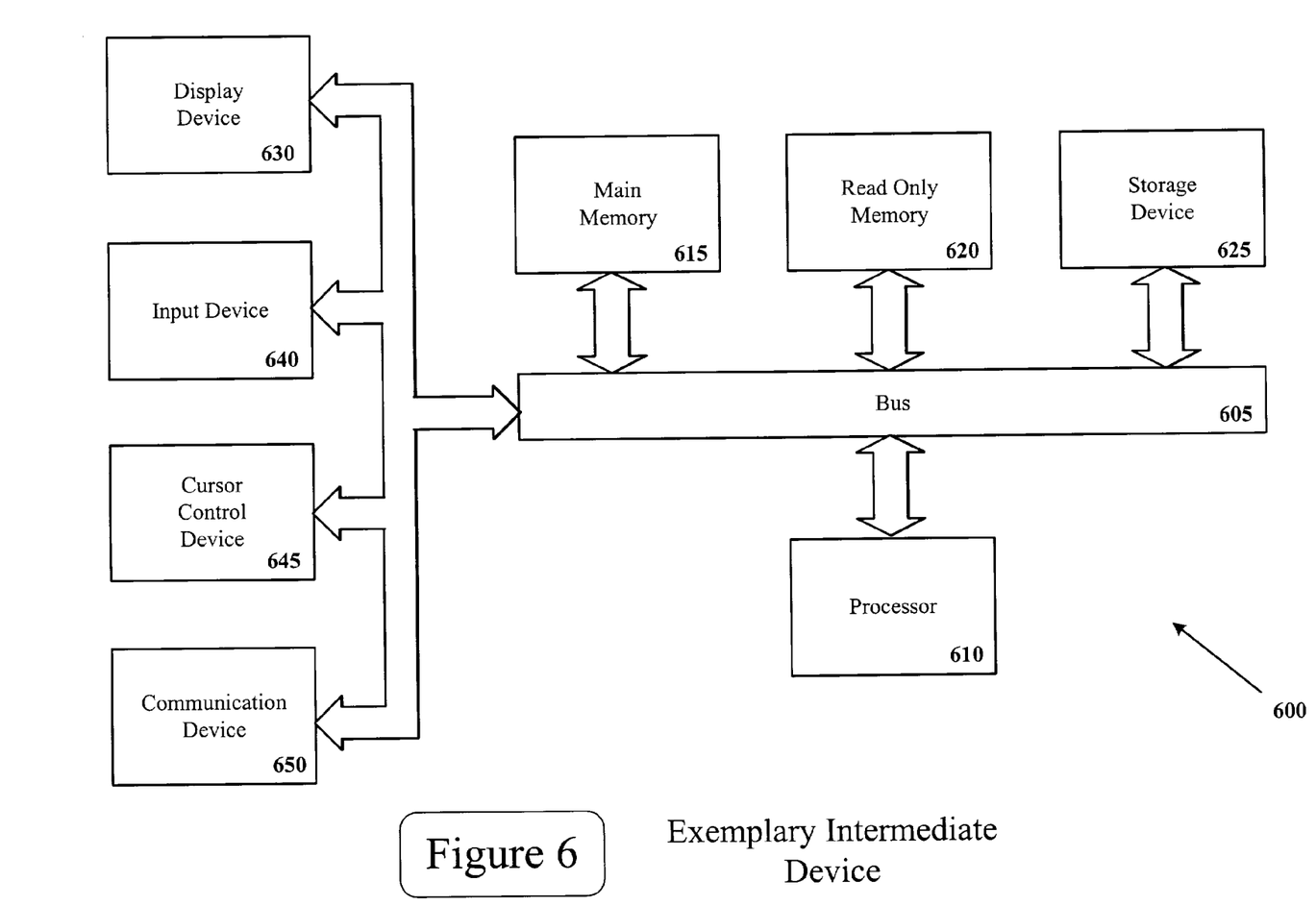
FIG. 6 is an illustration of an exemplary intermediate device under an embodiment of the invention.

FIG. 6 is a block diagram illustrating an exemplary intermediate device that may be utilized under an embodiment of the invention. Not all intermediate devices are structured as shown in FIG. 6. In addition, certain intermediate devices may utilize elements shown in FIG. 6 as auxiliary devices that are external from the intermediate device. Under an embodiment of the invention, an intermediate device 600 comprises a bus 605 or other communication means for communicating information, and a processing means such as a processor 610 coupled with the bus 605 for processing information. Under an embodiment of the invention, processor 610 may include processing devices in addition to a general purpose processor, including, for example, a digital signal processor. The intermediate device 600 further comprises a random access memory (RAM) or other dynamic storage device as a main memory 615 for storing information and instructions to be executed by the processor 610. Main memory 615 also may be used for storing temporary variables or other intermediate information during execution of instructions by the processor 610. The intermediate device 600 also may comprise a read only memory (ROM) 620 and/or other static storage device for storing static information and instructions for the processor 610.

A data storage device 625 may also be coupled to the bus 605 of the intermediate device 600 for storing information and instructions. The data storage device 625 may include a magnetic disk or optical disc and its corresponding drive, flash memory or other nonvolatile memory, or other memory device. The intermediate device 600 may also be coupled via the bus 605 to a display device 630, such as a liquid crystal display (LCD) or other display technology, for displaying information to an end user. In some environments, the display device may be a touch-screen that is also utilized as at least a part of an input device. In some environments, display device 630 may be or may include an auditory device, such as a speaker or output line for providing auditory information. An input device 640 may be coupled to the bus 605 for communicating information and/or command selections to the processor 610. In various implementations, input device 640 may be a keyboard, a keypad, a touch-screen and stylus, or other input device, or combinations of such devices. Under an embodiment of the invention, input device 640 includes a voice input system, including a microphone for usage in speech recognition. Under an embodiment of the invention, input device 640 may include an analog to digital converter for conversion of vocal commands to digital signals. Another type of user input device that may be included is a cursor control device 645, such as a mouse, a trackball, or cursor direction keys for communicating direction information and command selections to processor 610 and for controlling cursor movement on display device 630.

A communication device 650 may also be coupled to the bus 605. Depending upon the particular implementation, the communication device 650 may include a transceiver, a wireless modem, a network interface card, or other interface device. The intermediate device 600 may be linked to a network or to other devices using the communication device 650, which may include links to the Internet, a local area network, or another environment.

The invention has been described in terms of several embodiments. However, those of ordinary skill in the art will recognize that the invention is not limited to the embodiments described, but rather that modifications and changes may be made without departing from the broader spirit and scope of the invention. The specification and drawings are thus to be regarded as illustrative rather than limiting.

What is claimed is:

1. A method comprising:
   determining a physical location of a mobile device;
   determining that a subject device is available for command via the mobile device based at least in part on the physical location of the mobile device;
   transferring information regarding voice recognition capability of the subject device to the mobile device;
   receiving a voice command at the mobile device;
   interpreting the voice command; and
   providing an instruction to the subject device based at least in part on the voice command.

2. The method of claim 1, further comprising determining based at least in part on the physical location of the mobile device that a plurality of devices are available for voice command and requesting a choice of the available devices.

3. The method of claim 1, further comprising programming the mobile device to respond to voice commands of an individual.

4. The method of claim 3, further comprising the subject device executing the instruction.

5. The method of claim 4, further comprising mapping voice commands recognized by the mobile device to instructions understood by the subject device.

6. The method of claim 1, wherein the information regarding voice recognition capability includes grammar and vocabulary understood by the subject device.

7. A machine-readable medium having stored thereon data representing sequences of instructions that, when executed by a processor, cause the processor to perform operations comprising:
   determining that a first device is available for command via a second device based at least in part on a determined physical location of the second device, the second device being a mobile device;
   transferring information regarding voice recognition capability of the first device to the second device;
   providing a voice command to the second device;
   interpreting the voice command; and
   providing an instruction to the first device based at least in part on the voice command.

8. The medium of claim 7, further comprising instructions that, when executed by the processor, cause the processor to perform operations comprising determining based at least in part on the physical location of the first device that a plurality of devices are available for voice command and requesting a choice of the available devices.

9. The medium of claim 7, further comprising instructions that, when executed by the processor, cause the processor to perform operations comprising programming the second device to respond to voice commands of an individual.

10. The medium of claim 9, wherein the first device executes the instruction.

11. The medium of claim 10, further comprising instructions that, when executed by the processor, cause the processor to perform operations comprising mapping voice commands recognized by the second device to instructions understood by the first device.

12. The medium of claim 7, wherein the information regarding voice recognition capability includes grammar and vocabulary understood by the first device.

13. An intermediate device comprising:
   a discovery portion, the discovery portion determining a physical location of the intermediate device and, based at least in part on the determined physical location, determining that a subject device is available for voice command, the intermediate device being a mobile device;
   a speech recognition portion, the speech recognition portion interpreting a voice command; and
   a speech portion, the speech portion providing an instruction to the subject device based at least in part on the voice command.

14. The intermediate device of claim 13, wherein the discovery portion determines the physical location of the intermediate device by global positioning satellite (GPS) detection or by hotspot detection.

15. The intermediate device of claim 13, wherein the discovery portion stores parameters of the subject device.

16. The intermediate device of claim 13, wherein the subject device provides information to the intermediate device regarding speech capabilities of the subject device.

17. The intermediate device of claim 13, wherein the intermediate device is adapted to respond to the voice of an individual.

18. The intermediate device of claim 13, wherein the subject device does not have speech recognition capability and wherein the intermediate device maps a voice command to an instruction for the subject device.

19. An intermediate device comprising:
   a means for determining a physical location of the intermediate device, the intermediate device being a mobile device;
   a means for discovering a subject device that is available for command based at least in part on the physical location of the intermediate device;
   a means for receiving information regarding voice recognition capabilities of the subject device;
   a means for receiving a voice command;
   a means for interpreting the voice command; and
   a means for transferring an instruction to the subject device, the instruction being based at least in part on the voice command.

20. The intermediate device of claim 19, wherein a plurality of devices are available for command, and further comprising a means for making a choice of the devices.

21. The intermediate device of claim 19, wherein the means for discovering the subject device further includes a means for transmitting a request for available devices and a means for listening for a reply to the request.

22. The intermediate device of claim 19, wherein the means for determining the physical location of the intermediate device comprises a global positioning satellite system.

23. The intermediate device of claim 19, further comprising a means for adapting the intermediate device to the voice of a particular individual.

24. The intermediate device of claim 19, wherein the subject device is not speech-enabled and further comprising a means for mapping a voice command to an instruction for the subject device.

25. A speech recognition system comprising:
a first device, the first device being a mobile device, the first device determining a physical location of the first device, the first device interpreting a voice command, the first device providing an instruction, the instruction being based at least in part on the voice command; and
a second device, the second device being identified as available for command at least in part on the basis of the physical location of the first device, the second device receiving the instruction, the second device executing the instruction.

26. The speech recognition system of claim 25, wherein the first device includes a global positioning satellite (GPS) detection unit.

27. The speech recognition system of claim 26, wherein determining the availability of the second device further includes the first device providing a request for availability and the second device providing a response to the request.

28. The speech recognition system of claim 25, wherein the first device includes a speech module and the second device includes a speech module, and wherein the speech module of the second device provides information regarding the capabilities of the second device to the speech module of the first device.

29. The speech recognition system of claim 28, wherein the first device maps a voice command to an instruction understood by the second device.

* * * * *

UNITED STATES PATENT AND TRADEMARK OFFICE
CERTIFICATE OF CORRECTION

PATENT NO. : 7,184,960 B2  
APPLICATION NO. : 10/187232  
DATED : February 27, 2007  
INVENTOR(S) : Deisher et al.

Page 1 of 1

It is certified that error appears in the above-identified patent and that said Letters Patent is hereby corrected as shown below:

In column 2, at line 31, delete "instruction" and insert --instructions--.
In column 11, at line 1, delete "intennediate" and insert --intermediate--.

Signed and Sealed this

Thirteenth Day of May, 2008

JON W. DUDAS  
*Director of the United States Patent and Trademark Office*